United States Patent [19]

Fisher

[11] 3,878,323

[45] Apr. 15, 1975

[54] DETECTING DEVICES FOR IMAGE ANALYSIS SYSTEMS

[75] Inventor: Colin Fisher, Royston, England

[73] Assignee: Image Analysing Computers Limited, Royston, England

[22] Filed: Aug. 24, 1971

[21] Appl. No.: 174,360

Related U.S. Application Data

[63] Continuation-in-part of Ser. No. 820,532, April 30, 1969, Pat. No. 3,621,129.

[52] U.S. Cl. ..... 178/6.8; 178/DIG. 1; 178/DIG. 21; 178/DIG. 33; 178/DIG. 37; 235/92 PC

[51] Int. Cl. .......... H04n 7/18

[58] Field of Search. 178/DIG. 1, DIG. 33, DIG. 37, 178/DIG. 21, DIG. 3, 6.8; 235/92 PC

[56] References Cited

UNITED STATES PATENTS

| | | | |
|---|---|---|---|
| 2,885,551 | 5/1959 | Greanias | 328/146 |
| 3,566,281 | 2/1971 | Daumann | 307/235 |

*Primary Examiner*—Howard W. Britton
*Assistant Examiner*—Michael A. Masinick
*Attorney, Agent, or Firm*—Browne, Beveridge, DeGrandi & Kline

[57] ABSTRACT

Detection devices for image analysis systems employing line scanning in which detection is in part governed by inspecting video signal from portions of scan lines intersecting a feature under analysis other than that currently being scanned.

In one device a reference level voltage for threshold detection is generated by generating the mean of the whitest and blackest signal levels of image portions immediately before and after that currently under analysis so that the reference threshold is constantly equated to the black and white content of the image under analysis.

In another device the inspection image portions before and after that currently under analysis allow a decision to be made as to whether the current portion is inside or outside feature defined only by a boundary having an unsymmetrical density profile.

Another system allows a tentative detection decision to be made from the information from one portion of a line scan and a final detection decision to be made after comparing the provisional decision with a later decision based on information from (preceding and following) a line scanned portion following that on which the tentative decision was made.

42 Claims, 13 Drawing Figures

DETECTING DEVICES FOR IMAGE ANALYSIS SYSTEMS

This application is a continuation-in-part of U.S. application Ser. No. 820,532, filed Apr. 30, 1969, now U.S. Pat. No. 3,621,129.

This invention concerns detection devices for use in a line-by-line scanning system in which an image is scanned and video signal is produced representative of the scanned image.

In general an image containing feature to be analysed is scanned by an inspection spot in a series of lines. The resulting variations in optical intensity are converted to an electronic signal exactly comparable to a television video-wave form. To this end a television camera is employed and where microscopic specimens are concerned this is coupled to a light microscope.

A video signal has a limited response to fine detail and its characteristic resolution is determined inter alia by the band-width of any electronic equipment through which the signal passes, the resolution of any optical system employed and the effective size of the scanning-spot. The wave form will therefore have a finite time of response to any change in the specimen. By the process of "Detection" the practical video-signal is modified into a two-state binary signal, one state corresponding to the desired part of the image and the other corresponding to the undesired part.

Figure 12:
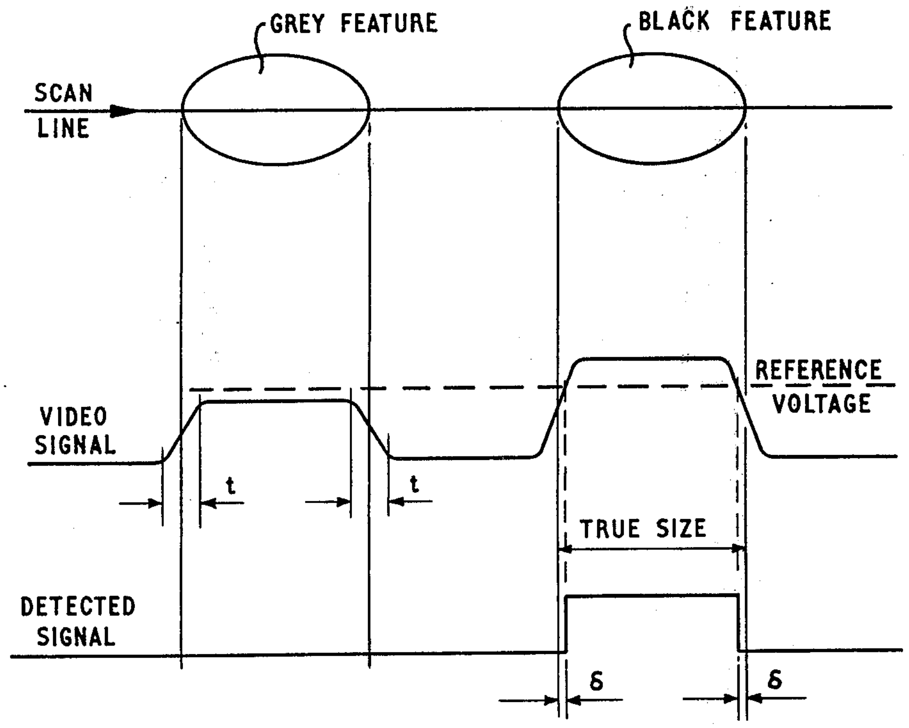

Any detection system has two important characteristics, first, its selection accuracy i.e. the reliability with which it takes the binary decision of including or excluding parts of the image and second its positional accuracy with which it takes the decision. FIG. 12 shows a typical video-signal resulting from a scan traversing two features of different grey values and the same video-signal after passing through a hypothetical detection circuit which has been set so as to select only the black featues.

This is achieved by detecting relative to a reference voltage intermediate the grey and black levels and an inaccurate decision could result if the background level varied as between the two features. In the case illustrated the circuit has made an accurate selection and a binary signal only appears for the black feature. However, it also illustrates how a positional inaccuracy can occur since a larger "chord" will be obtained if a detection decision is made at the bottom of the pulse than if it is made nearer the top of the pulse. This is due to the sloping leading and trailing edges of the video-signal pulse which are in turn due to finite spot size and limited band-width and means that any subsequent circuitry responsive to the detected video-signal will be presented with pulses whose duration are such as to appear to come from a feature larger or smaller than it should be and two features of the same actual size but detected at different levels could be sized differently.

A picture reproducer has been described in an article by Heinz Laass in Radio Mentor, April 1958, in which a reference voltage is generated from a background signal at the beginning of each line scan of an image and a detected video-signal is derived by gating an a.c.-signal of constant frequency when the video signal amplitude during the line scan exceeds the reference voltage set for that line. It is claimed that signal changes corresponding to variations in background colour (which occur in a frame scan direction but which are constant for the duration of a line scan) can be eliminated from the detected video signal.

It will be readily understood that variations in background colour which occur along a line scan, cannot be corrected by the apparatus described above, nor will the apparatus correct for variations in the sensitivity of a source of video signal which is subject to so-called "shading" error. Whereas this limited form of correction is useful when reproducing signed cheques (given as the preferred use for the apparatus described in the Radio Mentor Article), it is not sufficient for general image analysis in which variation in background can occur in any direction.

Furthermore, this apparatus in no way corrects for positional inaccuracies described above.

It is therefore an object of the present invention to provide a detection device which will accurately select features according to their grey level relative to a local background, independently of any grey level variations in the background.

A subsidiary object is to provide a detection device in which the position at which a detection decision is made is independent of the setting of a selection threshold.

The invention therefore provides an improved detection device for an image analysis system employing line scanning in which a reference voltage for controlling detection of a video-signal of the image is generated during scanning of the image, wherein the reference voltage has a magnitude which is at least in part dependent on the instantaneous amplitude of the video signal.

In order to remove directional characteristics of the device proposed by the present invention, the reference voltage is preferably derived from video signal from image portions close to the one from which the video signal is derived both in the same scan line and also in line scans before and after that containing said one image portion.

According to another aspect of the present invention a detection device for detecting in a video signal, signals corresponding to features having a desired edge or boundary density profile comprises, means for delaying the video signal to produce first and second delayed video signals, the second being delayed for a longer period of time than the first and means for comparing the relative magnitudes of the instantaneous excursions of the video signal and the first and second video signals and for generating a detected signal dependent on the comparison.

According to a further aspect of the present invention a detection device for use in a line-by-line scanning system in which an image is scanned and a video signal is produced representative of said scanned image, comprises first comparator means for comparing the instantaneous excursion of the video signal with a reference voltage for generating a detected signal dependent on said comparison, means for delaying the detected signal for a predetermined period of time, second comparator means for comparing the delayed detected signal with the detected signal obtaining at the end of said predetermined time period and means for releasing the delayed detected signal dependent on the comparison performed by said second comparator means.

Other objects and advantages of the present invention will be apparent from the accompanying drawings and description thereof.

Figure 1:
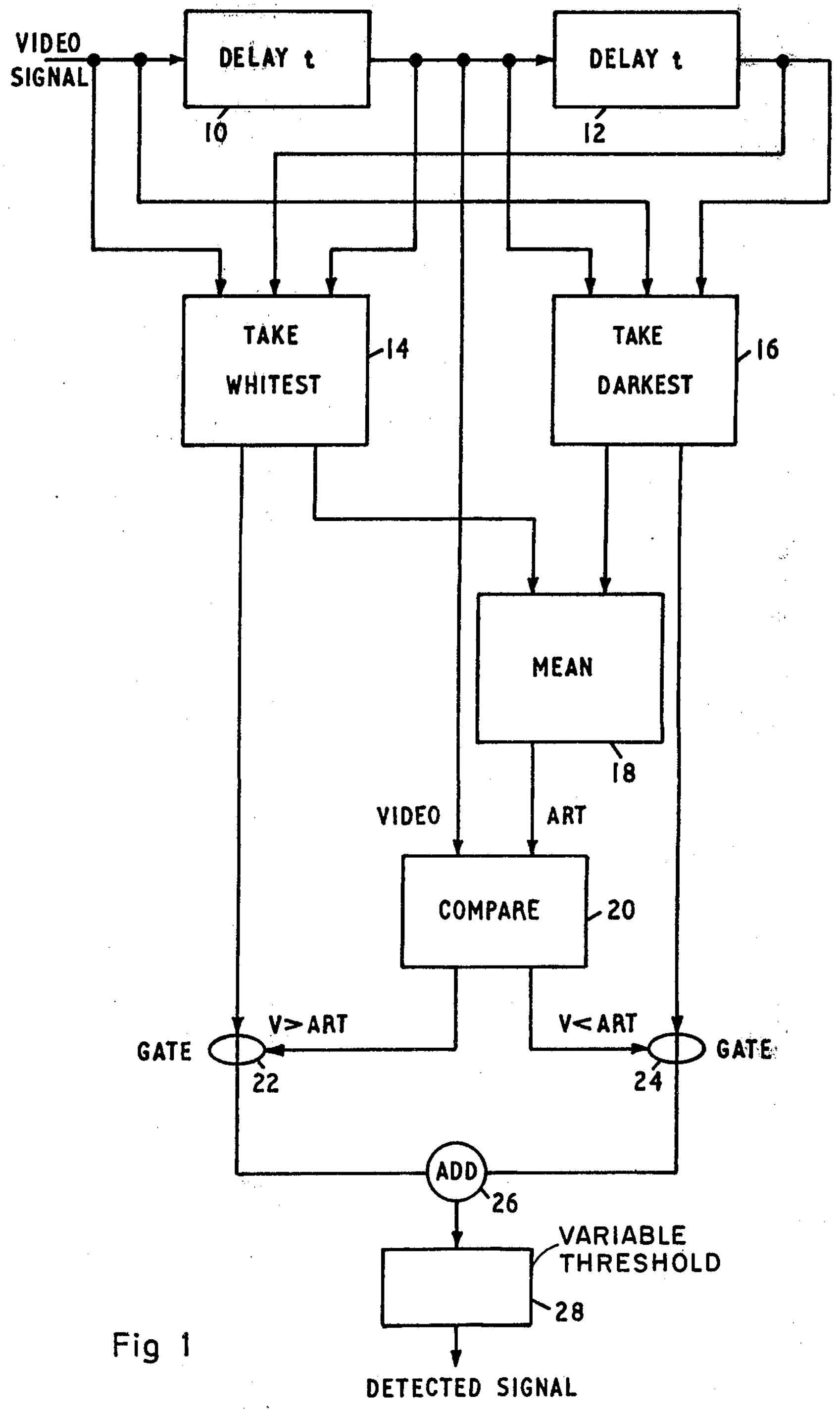
Figure 2:
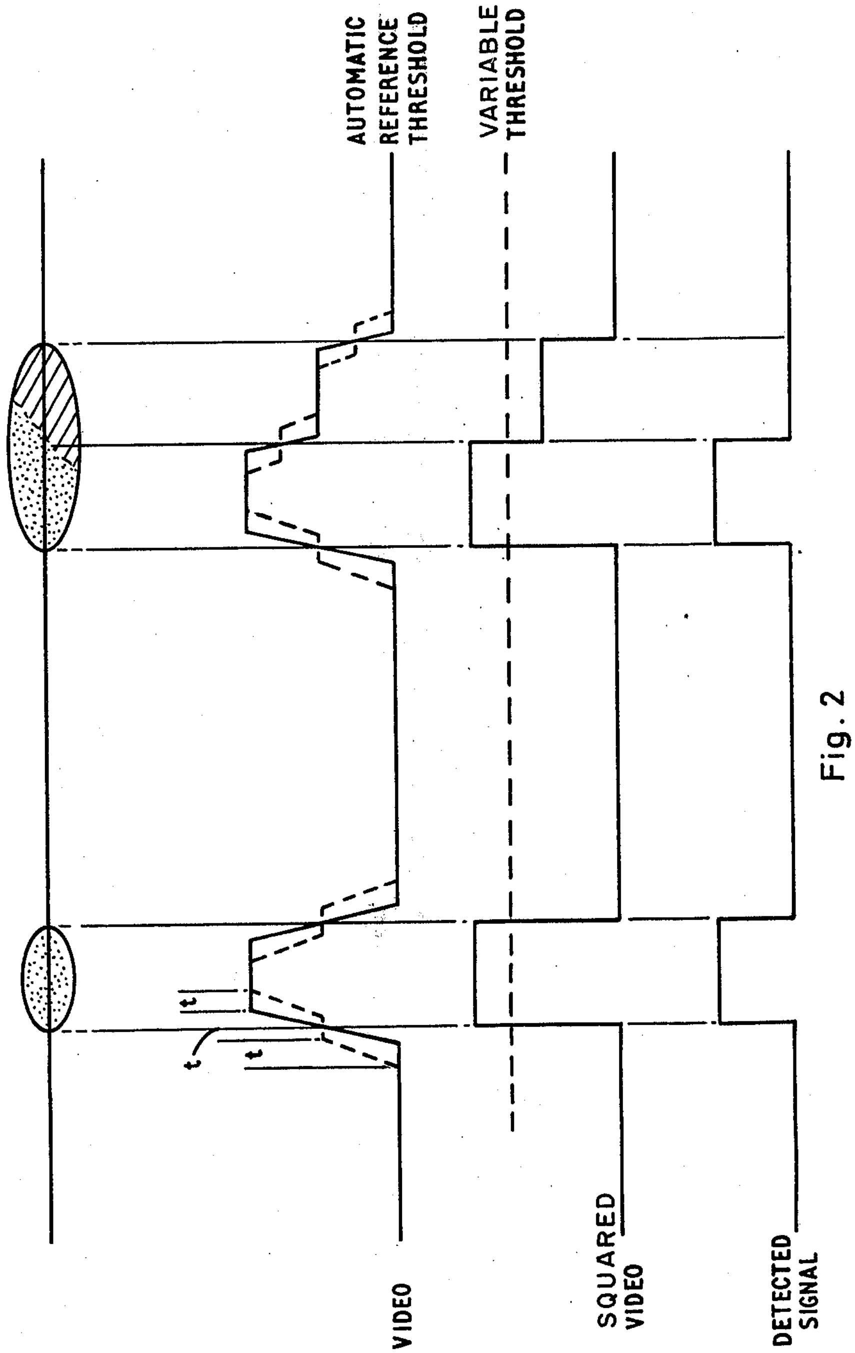
Figure 3:
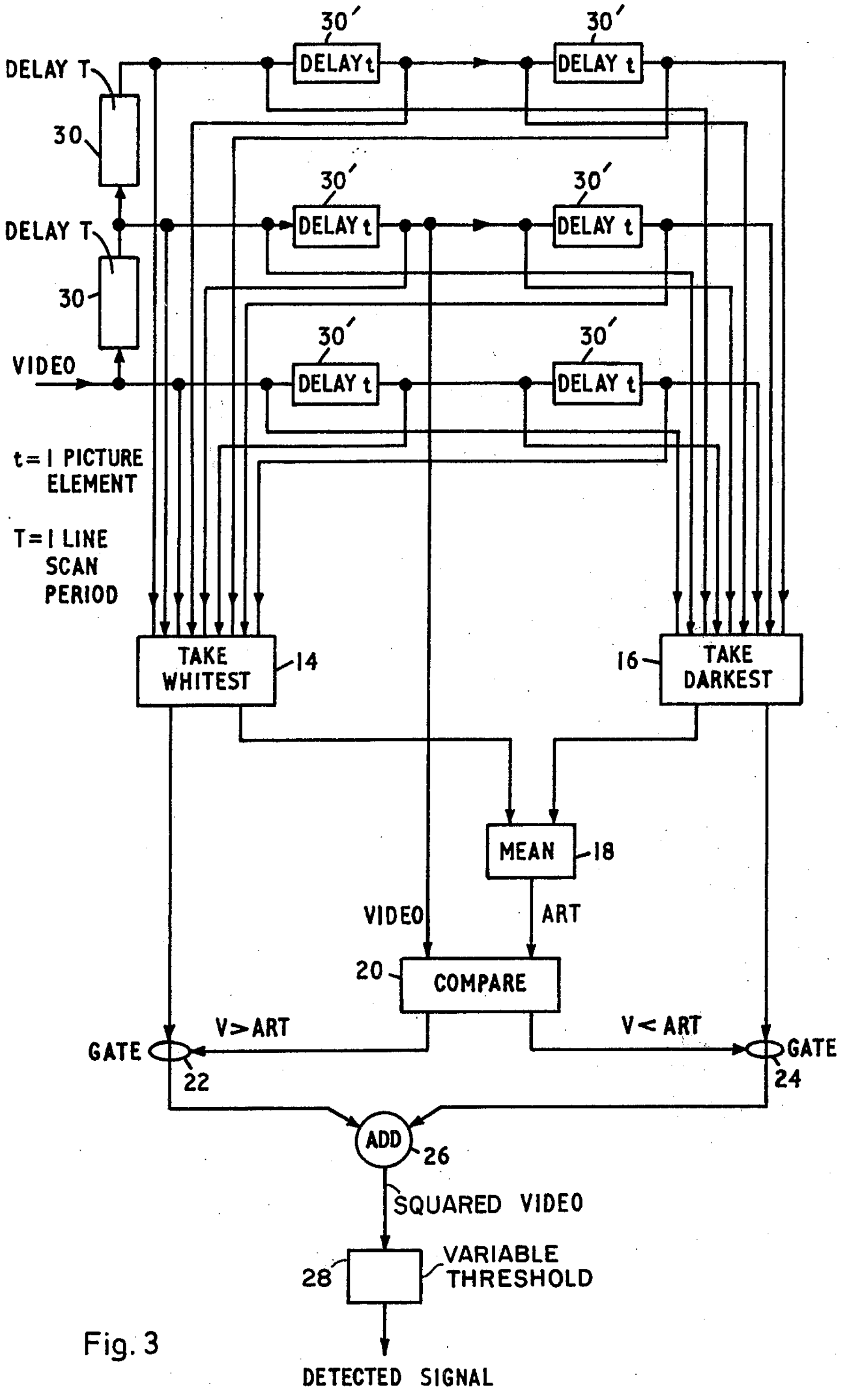
Figure 4:
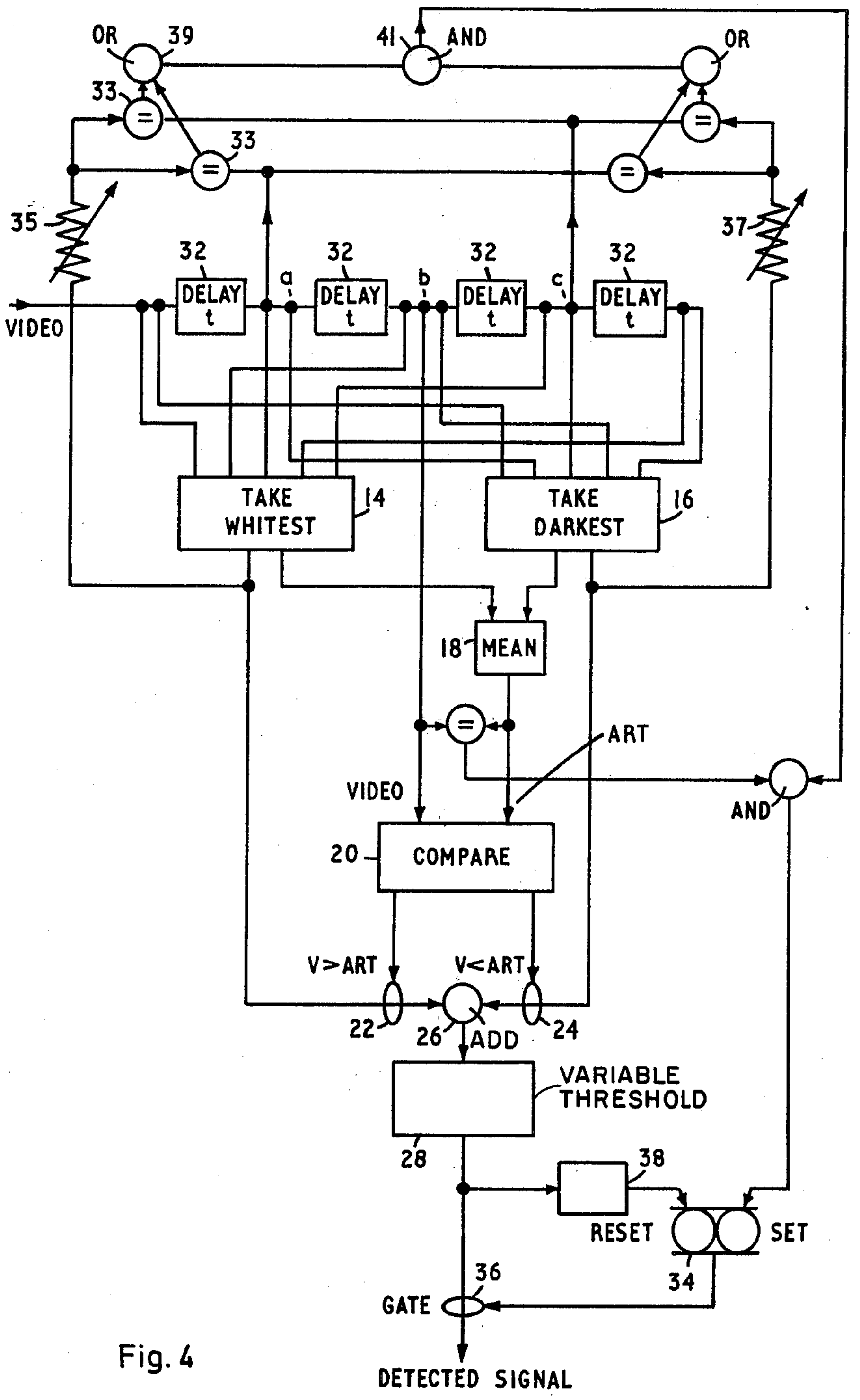
Figure 5:
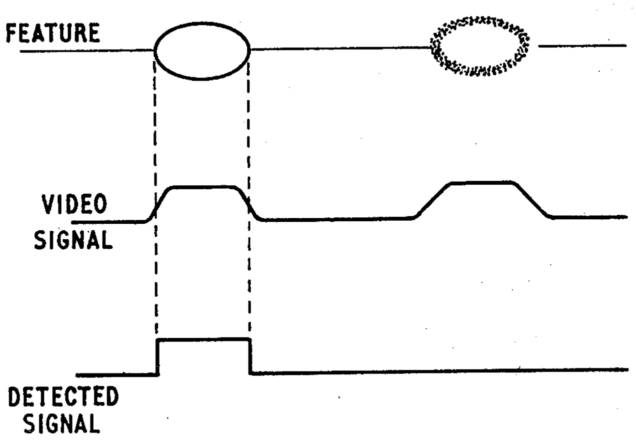
Figure 6:
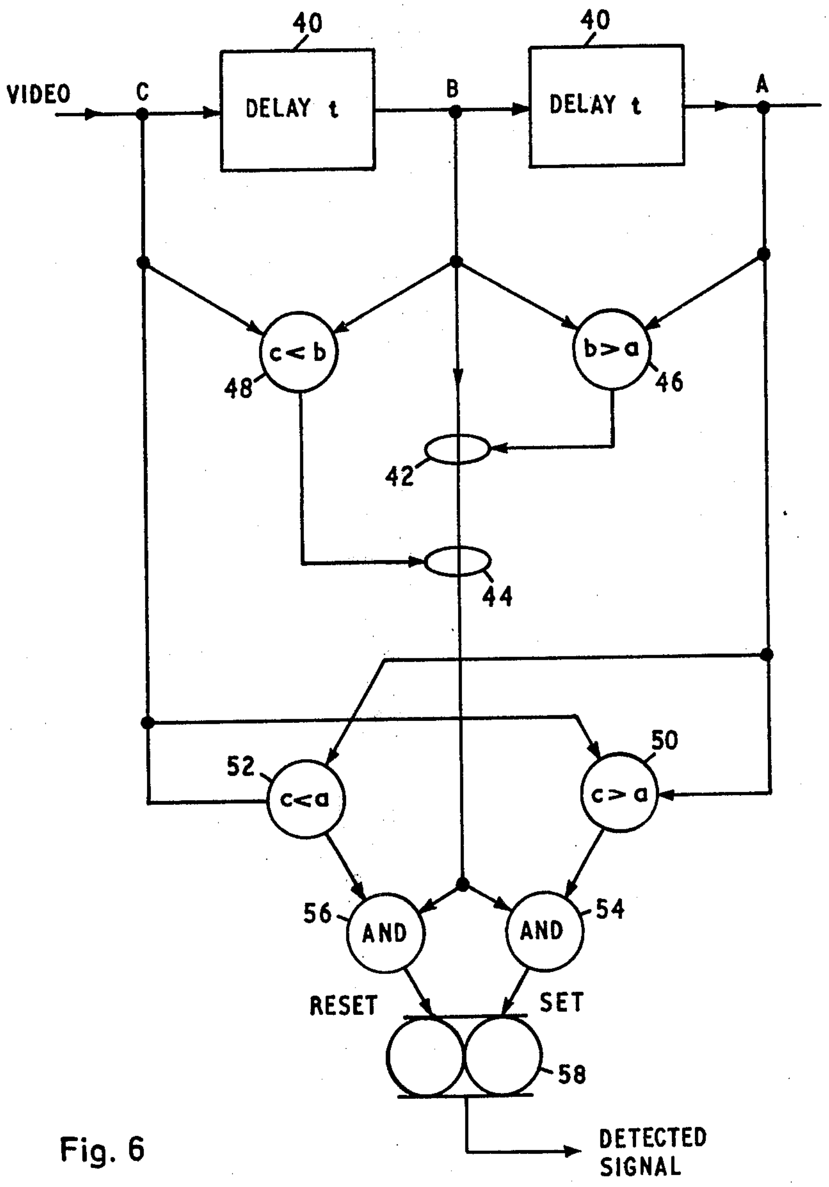
Figure 6A:
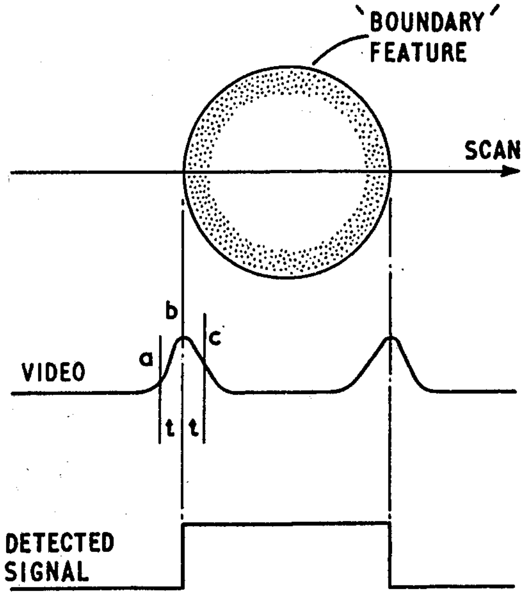
Figure 7:
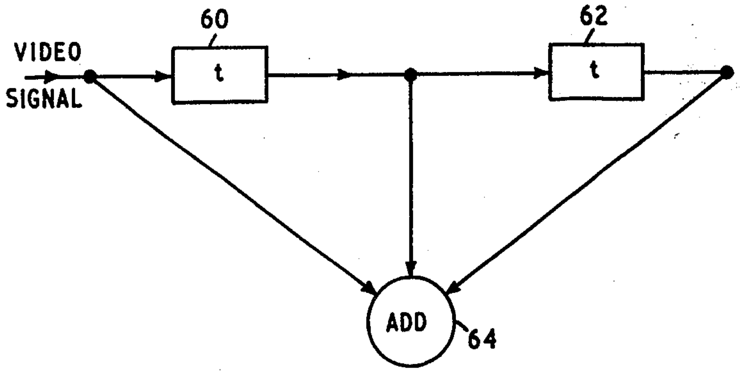
Figure 8:
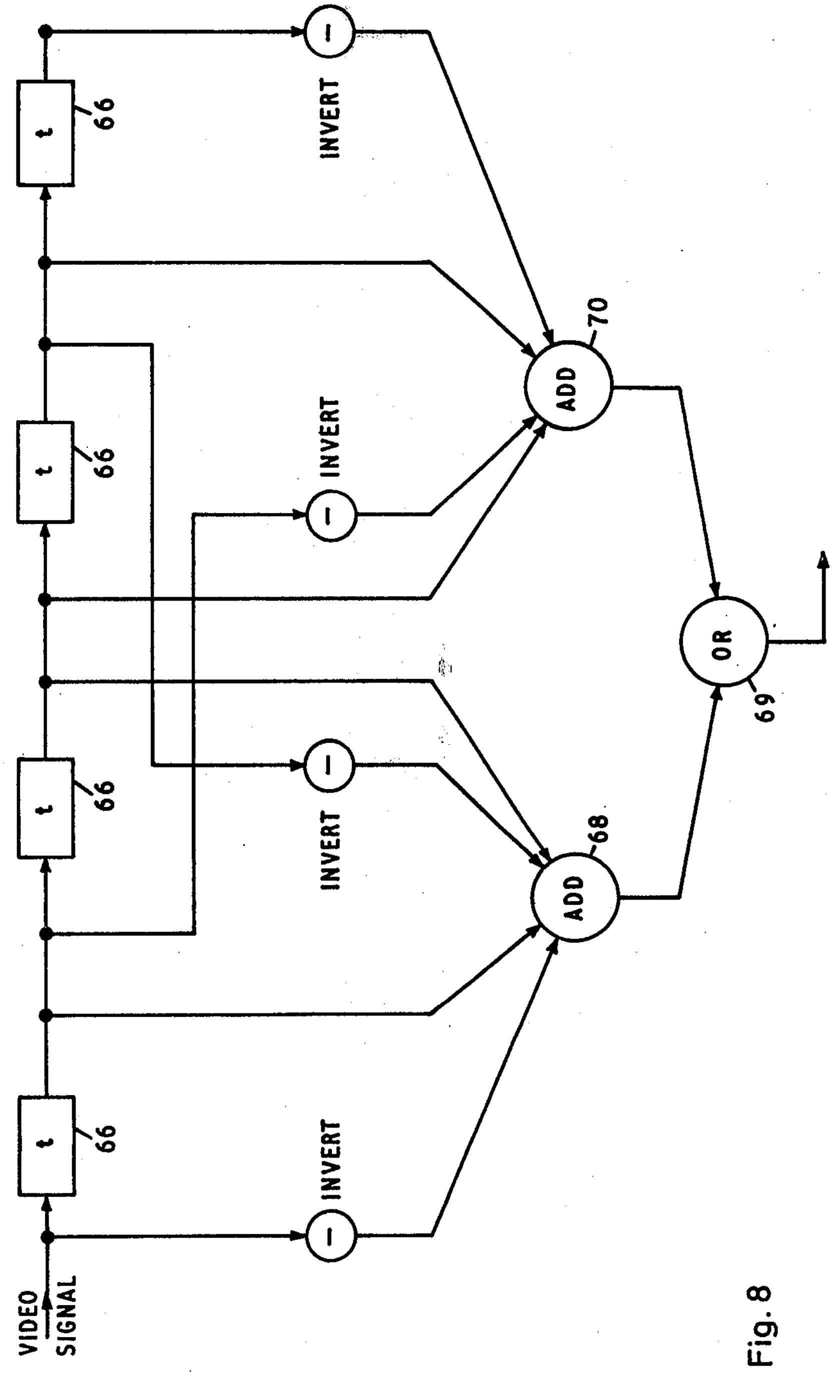
Figure 9:
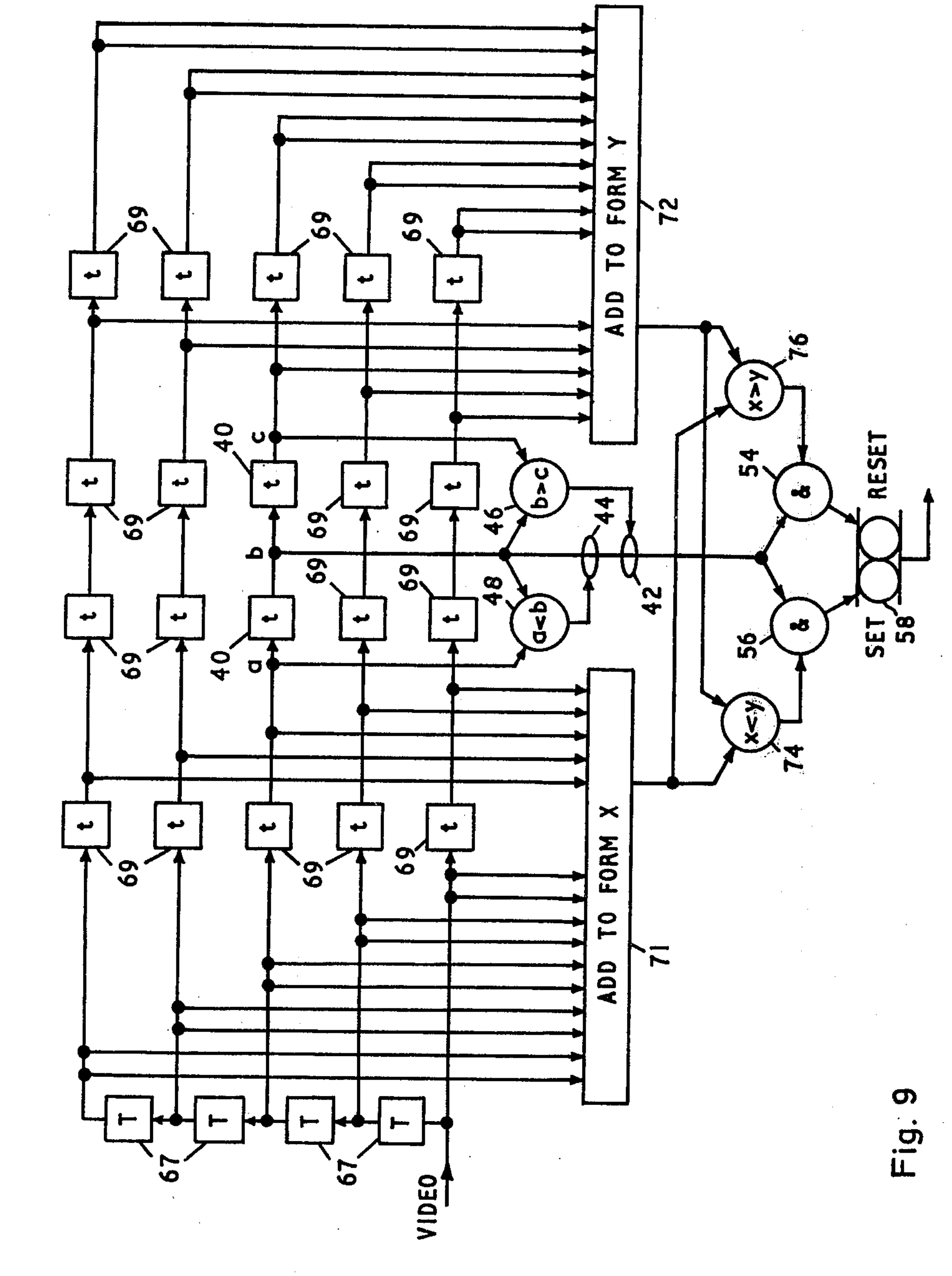
Figure 10:
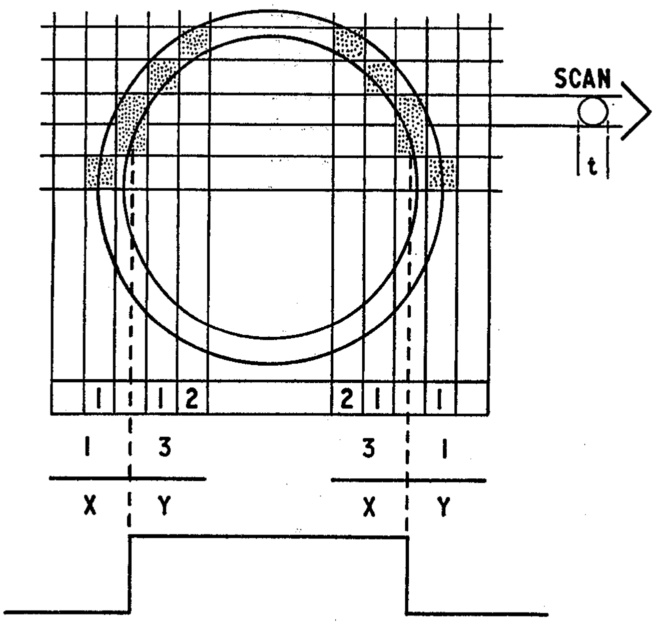
Figure 11:
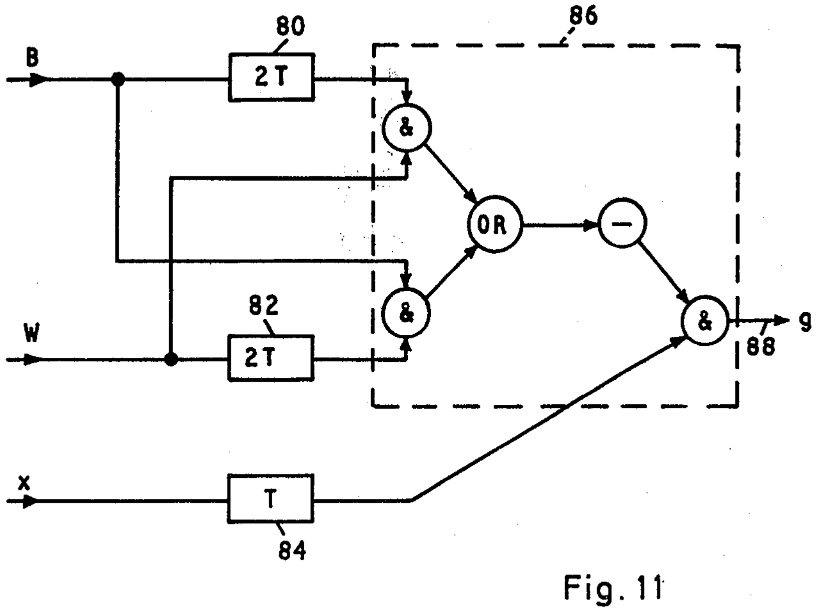

In the drawings:

FIG. 1 is a block schematic circuit diagram of one embodiment of the invention,

FIG. 2 illustrates graphically signal wave-forms at different points of the circuit of FIG. 1, FIG. 3 illustrates a second embodiment, FIG. 4 illustrates an embodiment of the second aspect of the invention which is arranged to detect only in focus features by inspecting edge density variations, FIG. 5 illustrates graphically signal wave-forms at different points of the circuit of FIG. 4, FIG. 6 illustrates another embodiment of the second aspect of the invention which is arranged to inspect boundary density variations to determine whether the spot is inside or outside a boundary feature, FIG. 6A illustrate wave-forms associated with FIG 6, FIGS. 7 and 8 illustrate two modifications which can be fitted (but not necessarily) to any of the embodiments of FIGS. 1, 3, 4 or 6, FIG. 9 illustrates another detection device similar to that shown in FIG. 6 for detecting boundary features, FIG. 10 illustrates graphically the operation of the device of FIG. 9, and FIG. 11 illustrates a combined arrangement.

FIG. 12 shows a typical video signal resulting from a scan traversing two features of different gray values and the same video signal after passing through a hypothetical detection circuit which as been set so as to select only the black features.

FIG. 1 illustrates a system which employs an automatic threshold which is automatically set to a fixed fraction of the local change in amplitude of the video signal i.e. the threshold voltage is a linear combination of the local highest and lowest video signal amplitude values. In this way the size of the detected signal is governed by a logical criterion related to the true feature size. Typically the threshold voltage is set to one half the local video signal change.

In FIG. 1 two delays 10, 12 are connected in series so that three video signals identical but separated in time can be derived from one video signal. Since the scanning spot moves at a fixed velocity the three video signals can be considered to come from three separate points separated by elements of line scan. If each delay has a time delay equal to the rise time of the system, and if the rise time is primarily cause by the spot size (as is usual) the spacing will be commensurate with the spot size. The expression "rise time" is used to mean the time occupied by the amplitude change in the video signal output of the system, as the spot scans across a boundary between two distinctly contrasting area, both areas being larger than the spot. The three video signals are applied to the three inputs on each of two circuit blocks 14, 16. Circuit 14 selects the video signal amplitude corresponding to the whitest picture point and circuit 16 that corresponding to the darkest picture point of the three points considered. As known to those skilled in the art, units 14 and 16 can be three-input comparators. In a conventional system in which the instantaneous amplitude of the video signal is a measure of the whiteness at that instant, this can be achieved quite simply by discriminating between the three signals according to their relative amplitudes. A third circuit 18 determines the arithmetic means of the two amplitudes selected by the two circuit blocks 14, 16 to provide a reference threshold voltage with which the instantaneous video signal amplitude is compared, the reference threshold varying automatically in response to grey-level variations of the background. Circuit 18 may be an averaging circuit having two inputs. In this way the detection criterion is constant for all features, namely a feature is detected when its grey level exceeds the arithmetic means of local grey levels fixed geometrically in position relative to the instantaneous video signal at any time. The video signal from the first delay 10 is compared in a comparator 20 with the automatic reference threshold and one of two gates 22, 24 is operated depending on whether the video signal amplitude is above or below the automatic reference threshold. The two gates 22, 24 allow the passage of a signal corresponding either to the whitest or to the darkest picture points, to an adding stage 26. The output from 26 therefore consists of a video signal with abrupt changes in place of what were originallly slow changes. A variable threshold 28 allows the selection of the required part of the video signal. More than one variable threshold 28 can be used when a band of optical density information is required.

It is important to notice that many more than two delay can be used so as to allow the system to operate correctly on parts of the video signal whose rise time is longer than $t$, and this is indeed necessary when examining features with edges lying anything but perpendicular to the scan direction.

The delays 10, 12 are preferably delay lines but any suitable memory device can be used.

If the resolution of the system is limited by the size of the scanning spot then the 50% criterion illustrated is correct for determining the true feature size. If the resolution is limited by optical effects, such as diffraction or perhaps electronic effects such as bandwidth limitation, then other criteria should be used and the value of the automatic reference threshold should be derived according to the relevant law.

This system greatly reduces detection decision inaccuracy caused by background variation or shading. It also greatly reduces or eliminates detection inaccuracies caused by fixed reference thresholds, and variable thresholds.

It does however slightly worsen the effect of electrical "noise". This will lead to a slight increase in both detection decision errors and detection inaccuracies arising from this cause. It can also make both detection decision errors and detection inaccuracies in regions where more than two levels of video come very close together. If for instance black and white regions are separated by a small amount of grey region, the squared video-signal can ignore the existence of the grey region altogether. Fortunately, neither of these is a serious disadvantage in practice and the most serious disadvantage of this circuit is the apparent detection of two grey regions at the top and bottom of high contract features due to finite spot size. This can be reduced to a minimum by making the spacing between the horizontal scanning lines equal to the size of the spot so that the "grey" regions are limited to one line thickness.

FIG. 2 is a graphical illustration of idealised video-signals at various points in the system shown in FIG. 1.

A similar system to that shown in FIG. 1, is illustrated in FIG. 3. Here an array of delays 30 is arranged so that the automatic reference threshold can be derived not merely from nearby points in the same line but also nearby points in preceding and succeeding scanning lines. In this way the directional dependence of the automatic reference threshold is removed to the local contrast change irrespective of the angle between the scan direction and the edge of a feature. The arrangement illustrated shows a three-by-three matrix of delays 30 connected so that the central point in time supplies the video signal for subsequent treatment by a detection circuit. This central video-signal is preceded and followed by video-signals from the matrix which correspond to a ring of picture elements around the picture element corresponding to the central video-signal, which control the value of the automatic reference threshold. Of course many more delay lines can be added to the matrix so as to optimise operation and this is sometimes necessary because the resolution is defined in terms of less than 100% transition between black and white so that adjacent picture points are also affected by the presence or otherwise of a feature on a particular picture element. It is therefore sometimes advantageous to sense darkest and whitest picture elements slightly further removed than one picture element from the picture point under consideration.

The circuit of FIG. 3 is a two-dimensional arrangement in which the delays 30 forming the matrix are of two types. One type corresponds to the delay required between adjacent picture elements in one line and the other type corresponds to the delay between adjacent and close picture elements in adjacent lines. It will be appreciated that the delay required for the second type of delay will be very much greater than the delay required in the former.

In a more complicated arrangement three two-dimensional matrices as illustrated in FIG. 3 could be connected together by two delay devices (not shown) each corresponding to the total frame scan period. Video signals could then be obtained corresponding to a ring of picture elements from each of three successive frames. A device (not shown) could be included to alter the focus of the overall system between each successive frame by a small fixed amount. This variation in focus would represent a third dimension and by comparing the video signals from the successive frames, the risk that slightly de-focused regions of high contrast features may be detected as grey features can be substantially reduced.

It will be appreciated that the same technique may be employed whose colour television techniques are employed to allow for separate comparison of the colour signals.

The remainder of the system shown in FIG. 3 is similar to that shown in FIG. 1 and will not be described in detail.

It is also possible to take into account the variation of density around any particular picture element and allow the density variation to influence detection of the video signal corresponding to the picture element in question. One such arrangement is shown in FIG. 4. One application of this arrangement would be as a circuit for the rejection of features which are not exactly in focus. The problem of out of focus features often occurs in examination of three-dimensional objects and if some circuit such as this is not included then the resulting video signal can be biased in favour of the larger size feature which might be detected despite severe misfocusing. The arrangement shown in FIG. 4 is basically similar to an arrangment of FIG. 3 but includes the additional circuit elements required for the analysis of the surrounding density variation.

In FIG. 4, four delays 32 are connected in series whereby four delayed video signals can be obtained making, with the original video signal, five video signals in all. The delay introduced by each delay 32 will determine the spacing of the picture elements in te line of scan corresponding to the five video signals and all five signals are used to find the whitest and darkest levels in the same way as shown in FIG. 1. The second and fourth video signals are extracted and subjected to logic criteria in equality modules 33 which demand that they should equal or exceed a certain percentage of the darkest or whitest points (the means for determining this percentage being shown diagrammatically at 35, 37) in order that the detected video signal can appear at the output of the system. To this end electronic gates 39, 41 are provided. Thus if the condition is not satisfied at any time when the detected video would normally be passed to the output (i.e. the video supplied to the comparator 20 just equals or just exceeds the automatic reference threshold) then a gating bi-stable circuit 34 is not operated and no output is supplied from the system since a gate 36 operated by the gating bistable circuit 34 remains closed. If on the other hand the criterion is satisfied when the video supplied to the comparator 20 just equals or just exceeds the automatic reference threshold, then the bi-stable 34 is set and the gate 36 opened to allow detected video to pass as output.

The bi-stable 34 reset line is supplied from a detector circuit 38 which detects the end of a detected video signal so that the bi-stable 34 is reset ready for the next feature.

In the arrangement shown in FIG. 4 exact equality is demanded of the values of the second and fourth video signals but in practice it is envisaged that it would be more useful to impose limits rather than exact equality criteria on the values of these two video signals so as to define a maximum degree of mis-focus. Altenatively the system could include more delays so that the density variation of the edge of the feature is gauged over more picture elements than five. For example, it might be required to detect dark features which have a thin grey surrounding layer but reject those features which do not have such a surrounding layer. It will be appreciated that by applying the appropriate criteria to the extracted video signals and into passing detected video when the criteria are satisfied, such a circuit could be employed to distinguish between such features.

It will be further appreciated that further delays may be employed corresponding the the time between adjacent lines and/or between adjacent frames as described with reference to FIG. 3.

FIG. 5 is a graphical illustration of two differing outputs of feature and the idealised video signals resulting therefrom. The left-hand feature is in focus whereas the right-hand feature is not in focus. By employing the circuit of FIG. 4 the left-hand feature will be detected but no detected output will appear in the out of focus feature.

The application of an automatic reference threshold may also be employed in the detection of a feature having only a boundary. Here we are dealing with a type of feature which does not in genral have general different grey level within the boundary from that outside. This often means that it is a matter of guesswork to determine which is the feature and which is the surrounding grey area. Fortunately features of this type often have an assymmetrical boundary density profile (see FIG. 6). FIG. 6 illustrates a system which is arranged to detect a boundary feature and to decide whether a scan is entering or leaving a feature on a basis of the local density variations.

FIG. 6 is a graphical illustration of boundary feature of assymmetrical boundary density profile and an idealised video signal resulting therefrom. The two state, detected video signal indicating the difference between the outside and inside of the boundary is also shown. It will be seen that for equal intervals of time *t* each side of the "peak" of the boundary signal *b*, the signal amplitudes *a*and *c*are different.

In FIG. 6 two delays 40 are connected in series to produce two delayed video signals which (combine) together with the original video signal from three video signals.

The video signal which is supplied for detection is derived from the output *b* of the first delay and this output is supplied through two gates 42, 44 respectively. Gate 42 is controlled by a logic unit 46 while gate 44 is controlled by a logic unit 48. The logic unit 46 only opens gate 42 when the signal at *b* is greater than the signal at *a* (the output of the second delay) and the logic unit 48 only opens gate gate 44 when the signal at *b* is greater than the signal at *c* (the original video signal before delays 40). Thus video will only pass through the gates 42 and 44 when the signal at *b* corresponds to a boundary between two regions of different density to the boundary region.

Two later logic units 50 and 52 compare the video signals at *a* and *c* to determine which is the greater and in this way detect the asymmetry of the density profile of the boundary. The outputs from the logic units 50, 52 are supplied to AND gates 54, 56 together with the video output from the gate 44. Thus in the case illustrated a bi-stable circuit 58 having set and reset inputs supplied outputs from the AND gates 54, 56 respectively is "set" when the video signal amplitude at *c* is greater than the video signal amplitude at *a* and *c* and is "reset" when the video signal amplitude at *a* exceeds the video signal amplitude at *c* and the video signal amplitude at *b* is greater than that at both *a* and *c*. The bistable circuit 58 can therefore be used to indicate at any instant whether the scanning spot is outside or inside the boundary provided that there is a distinguishable difference in density between the region just inside and outside the boundary feature.

In detection systems it is possible to increase the sensitivity of the sytem to features having more than one picture elements' extent in the scan directions. A simple arrangement is shown in FIG. 7 in which two additional video signals are obtained from a single video signal by the use of the two delays 60, 62 and the original video signal and the video signal from the two delays are added in an adding circuit 64 to form a single video signal to be passed to the subsequent detection circuit. In this arrangement the sensitivity of the system to features of three or more picture elements' extent in the scan direction is tripled.

It will be appreciated where a large number of delays are employed in the form of a matrix which includes delay so that picture elements can be examined in successive lines as well as in a single line, by selecting the delays given by the various delay units, radial lines of picture elements can be examined simultaneously. This enhances the sensitivity of the system to any straight line component of the picture and it is to be noted that this is one of the most important properties of the human eye.

If a system employing the arrangement of FIG. 7 scans across a broken line, it will fill the break or breaks in the line provided that these are not too big. This is a most important facility when working on images which consist of many straight lines some of which are near the limits which would normally be set by noise, shading etc. and which are knwon to have a very low probability of being accurately aligned end on and separated by very few picture elements.

FIG. 8 illustrates an extension of the arrangement shown in FIG. 7 in which four delays 66 are used to generate five video signals. The outputs of the delays and the orginal video signal are connected in two sets of four to adding stages 68, 70 the selection of the first and fourth video signals in each of the two sets being such that the first and fourth video signal in each set is inverted with respect to the second and third video signals of each set. This gives four times the sensitivity to features of exactly two picture elements' width in the line scan direction.

By using a matrix of such delays including delays between lines, a system could be built up which is preferentially sensitive to features two picture elements wide in any direction. This type of preferential sensitivity is often useful particularly where one wishes to detect a structure such as a lattice network of lines without confusion from large patches of unwanted features.

FIG. 9 illustrates a detection system which is an extension of the arrangement shown in FIG. 6 for detecting a boundary feature. This arrangement is only suitable for non-re-entrant boundary features. Such a feature is illustrated in FIG. 10 as comprising a ring one picture element thick. Five line scans are shown crossing the ring and the five lines are divided into five picture elements in the region of where they cross the boundary feature and the picture elements overlying the boundary feature are shown shaded.

In the arrangement shown in FIG. 9 a number of delays 67, 69, 40 are arranged in a matrix so as to produce video signals corresponding to five consecutive picture elements along each of five consecutive line scans. The outputs from the delays in advance of the central picture element which is the one under examination at any instant (output *b*) are supplied to an adding circuit 71 and the outputs from the delays following the delay supplying the central video signal are applied to an adding circuit 72. The signals applied to the two adding circuits form two signals x and y respectively. It can be shown that (for the scan direction shown) the sum of the picture elements to the right of the third (i.e. central) picture element will exceed the sum of those to the left of this picture element when entering a non-re-entrant boundary feature whilst the sum of the elements to the right of centre will be less than the sum of the elements to the left of centre on leaving a non-re-entrant boundary feature. The position of the boundary is detected in the same way as illustrated and described in FIG. 6 and the same reference numerals have been employed for the devices in FIG. 9 similar to those in FIG. 6. All points to the left and to the right of centre are added up and weighted according to their distance from the centre in the adding circuits 70 and 72 so as to produce two signals x and y. The comparison circuits 74, 76 determine whether x or y is the greater and operate in conjunction with the detect boundary position to set the reset a bi-stable circuit 58 by means of AND-gates 56 and 54 in the same way as illustrated in FIG. 6.

According to a further aspect of the present invention a tentative or provisional detection decision is confirmed or denied to form a final detection decision by comparing the decision made in response to information in one portion of the total scan with information from a following portion of the scan. Thus a detection decision based on information from a first point in a line scan may be confirmed by a decision based on information from a later point in the line or in a subsequent line. In one possible arrangement (not illustrated) a detector such as illustrated in FIG. 1, 3, 4 or 6 is employed to generate a two-state signal corresponding to a tentative decision to which is then applied more elaborate criteria as described with reference to FIGS. 7, 8 or 9, adopting pure two-state logic techniques (i.e. where the ADD-modules are replaced by AND-modules etc.).

Occasionally a line scan will partly intersect a sudden change in contrast, for example from white to balck due to the finite spot size. Since only a portion of the thickness of the line scan (defined by the diameter of the scanning spot) intersects the change in contrast, the amplitude of the video signal resutling from the change in contrast will be less than if the scanning spot had wholly intersected the black feature. A detection circuit will "see" an apparently grey feature at that instant and if the detector has been set to respond to grey feature an inaccuracy will occur. Thus the arrangement illustrated in FIG. 11 is designed to hold the decision of a detection circuit for the duration of a line scan period and to compare the portion of the image immediately adjacent the portion containing the so-called grey feature in the previous and/or following line scan. If the adjacent portion is also grey then the original decision was apparently correct and will be allowed by the logic circuitry. If however the adjacent portion of the image is black then the earlier decision is obviously incorrect and no true grey feature existed until the beginning of the transition from white to black.

In FIG. 11 three detected signal outputs are taken from detection means (not shown) arranged to apply two reference thresholds so that three amplitude levels are detected, i.e. greater than both, less than both or between the two thresholds. The first two outputs correspond to black and white features respectively (B and W) and the third output is "tentative grey" X.

The B and W signals are passed through delays 80, 82 each having a delay equal to twice the line scan period while the X signal is passed through a delay 84 having a delay of only a single line period. In this way it is possible to observe the detected state of the signals from the scan lines before and after the X signal. Logic units within the box 86 prevent the passage of the X signal to the output 88 between two lines carrying black and white respectively and this avoids all "false" grey detection and gives only true grey outputs *g*.

In the systems described herebefore the signal storage devices referred to may comprise delay lines adapted to delay signals applied thereto by the required time intervals. Where appropriate the signal storage devices may comprise one or more electronic shift registers.

In some systems the electrical video signal is not a linear representation of the true image variations and such non-linearities can be compensated by employing an automatic reference threshold voltage generator which takes non-linear combinations of the local highest and lowest video signal amplitude values. This can also be of value in other circumstances such as when nearing the diffraction limit of resolution of the optical or other image forming means.

I claim:

1. A detection device for use in a line by line scanning system in which an image is scanned and a video signal is produced representative of said scanned image said detection device including, delay means for delaying the video signal to produce a second video signal, means for generating a reference voltage having a value which lies between the amplitude values of the signals supplied thereto, means for supplying said video signal and second video signal to the reference voltage generating means, comparator means for comparing the instantaneous amplitude of the second video signal with the reference voltage and, means operable in response to the comparison to release the voltage representative of the lower of the two video signal amplitudes while the instantaneous amplitude of the second video signal is less than the reference voltage and a voltage representative of the higher of the two amplitudes while the instantaneous amplitude exceeds the reference voltage.

2. A detection device as set forth in claim 1 wherein the reference voltage is the arithmetic means of the amplitude values of the two video signals.

3. A detection device as set forth in claim 1 wherein the reference voltage has a value which is a linear combination of the amplitude values of the video signal and second video signal.

4. A detection device as set forth in claim 1 wherein the reference voltage has a value which is a non-linear combination of the amplitude values of the video signal and second video signal.

5. A detection device for use in a line-by-line scanning system in which an image is scanned and a video signal is produced representative of said scanned image said detection device including, delay means an input for receiving video for said signal a small fraction of a line scan, and also having a plurality of outputs whereby a corresponding plurlaity of separate differently delayed video signals are obtained, means for selecting the highest and lowest of the amplitude values of the video signal and delayed video signals, means for generating a reference voltage having a value which lies between the said highest and lowest amplitude values, and comparator means for comparing the instantaneous amplitude of one of the delayed video signals with the reference voltage and for generating a detected signal dependent on the comparison.

6. A detection device as set forth in claim 5 wherein the reference voltage is the arithmetic means of the said highest and lowest amplitude values.

7. A detection device as set forth in claim 5 further comprising means for comparing the magnitude of the instantaneous amplitude of at least one of said delayed video signals with another voltage and means for controlling the release of the detected signal dependant on the comparison.

8. A detection device as set forth in claim 5 wherein the reference voltage has a value which is a linear combination of the said highest and lowest amplitude values.

9. A detection device as set forth in claim 5 wherein the reference voltage has a value which is non-linear combination of the said highest and lowest amplitude values.

10. A detection as set forth in claim 5 wherein said delay means comprises a plurality of separate signal delay devices.

11. A detection device as set forth in claim 10 wherein some of the signal delay devices introduce a time delay equal to the line scan period of hte line by line scanning system.

12. A detection device for use in a line-by-line scanning system in which an image is scanned and a video signal is produced representative of said scanned image said detection device including, delay means for delaying the video signal to produce at least one delayed video signal, means for generating an automatic reference threshold voltage haing a magnitude which is one half the sum of the local maximum and minimum instantaneous amplitude values of the video signal, comparator means for comparing the instantaneous amplitude of a delayed video signal with the automatic reference threshold voltage to thereby generate a detected signal whose value is dependent on the comparison and means for selecting one of the maximum and minimum amplitude values if the instantaneous amplitude of the video signal is greater, and the other if it is less, than said automatic reference threshold voltage, the selected value determining the value of the detected signal.

13. A detection device as set forth in claim 12 further comprising second comparator means for comparing the magnitude of the instantaeous amplitude of the detected signal with a fixed reference voltage, means for adjusting the value of said fixed reference voltage and means for generating a two value second detected signal having one value if the amplitude of the detected signal exceeds, and its other value if the amplitude is less than the chosen value for the said fixed reference voltage.

14. A detection device as set forth in claim 12 wherein said delay means comprises a plurality of separate signal delay devices whereby a corresponding plurality of separate differently delayed video signals are obtained.

15. A detection device as set forth in claim 14 wherein some of said separate signal delay devices introduce a time delay equal to the line scan period of the line-by-line scanning system.

16. A detection as set forth in claim 14 further comprising means for comparing the magnitude of said instantaneous amplitude of at least one of the separate delayed video signals with another voltage and means for controlling the release of the detected signal dependent on the comparison.

17. A detection device as set forth in claim 16 wherein said other voltage is the instantaneous amplitude of another of said separate delayed video signals.

18. A detection device for use in a line-by-line scanning system in which an image is scanned and a video signal is produced representative of said scanned image, said detection device including means for generating an automatic reference threshold voltage having a magnitude which is a fixed proportion of the local peak amplitude of the video signal and means for comparing the instantaneous amplitude of the video signal and means for comparing the instantaneous amplitude of the video signal with the automatic reference threshold voltage and for generating a detected signal dependent on said comparison, the means for generating the automatic reference threshold voltage comprising signal delay means for delaying the video signal to produce at least one delayed video signal, means for selecting the signal having the greater amplitude value and means for generating said automatic reference threshold voltage as a fixed proportion of the peak amplitude of the selected signal.

19. A detection device as set forth in claim 18 wherein magnitude of the automatic reference threshold voltage is one half of the peak amplitude of the selected signal.

20. A detection device for use in a line-by-line scanning system in which an image is scanned and a video signal is produced representative of said scanned image, said detection device including means for generating an automatic reference threshold voltage having a magnitude which is a fixed proportion of the local peak amplitude of the video signal and means for comparing the instantaneous amplitude of the video signal with the automatic reference voltage and for generating a detected signal dependent on said comparison, second comparator means for comparing the magnitude of the instantaneous amplitude of the detected signal with a fixed reference voltage, means for adjusting the value of said fixed reference voltage and means for generating a two value second detected signal having one value if the excursion of the detected signal exceeds and its other value if the excursion is less than the chosen value for the said fixed reference voltage.

21. A method of analysing an image comprising the steps of:

scanning the image in a series of parallel lines, generating a first video signal whose amplitude varies in accordance ith variations in image content, delaying the first video signal to produce a pluality of delayed video signals, selecting the highest and lowest of the amplitude values of the first and delayed video signals, generating a reference voltage havng a magnitude equal to a linear combination of the two selected amplitude values, comparing the instantaneous amplitude of one of the delayed video signals with the reference voltage and, generating a detected signal having one of two values depending on the comparison.

22. A method of analysing an image as set forth in claim 21 comprising the further step of releasing the higher selected amplitude value as the detected signal while the instantaneous amplitude of the one delayed video signal exceeds the reference voltage and the lower selected amplitude value as the detected signal while the instantaneous amplitude of one delayed video signal is less than the reference voltage.

23. A method of analysing an image as set forth in claim 22 wherein the reference voltage is the arithmetic means of the said highest and lowest of the amplitude values.

24. A detection device for use in a line-by-line scanning system in which an image is scanned and a video signal is produced representative of said scanned image, said detection device including means for delaying the video signal to produce first and second delayed video signals, the second being delayed for a longer period of time than the first, and means for comparing the relative magnitudes of the instantaneous excursions of the video signal and the first delayed video signal and for further comparing the instantaneous excursion of the first and second delayed video signals with each other, and for generating a detected signal dependent on said comparisons, first gating means for releasing said first delayed video signal in the event that its instantaneous excursion is greater than that of both of the video signal and the second delayed video signal, a bistable device whose SET and RESET conditions generate the detected signal and second gating means for supplying the released first delayed video signal as a SET and REST signal for the bistable device in the event that hte video signal excursion is greater or less than that of the second delayed video signal resepectively.

25. A detection device as set forth in claim 24 wherein said second delayed video signal is delayed for twice as long as the first delayed video signal.

26. A detection device as set forth in claim 25 wherein the delay means comprises two similar delay devices connected in series.

27. A detection device as set forth in claim 26 further comprising a plurality of signal delay devices connected in a series chain of which the said two similar signal delay devices comprise a part.

28. A detection device as set forth in claim 27 wherein the said two similar signal delay devices are preceded and followed by other signal delay devices in the chain so tht the video signal supplied to the first of the said two similar signal delay devices is delayed relative to the video signal obtained from scanning the image.

29. A detection device as set forth in claim 28 wherein some of the said other signal delay devices introduce a time delay equal to the line scan period of the line-by-line scanning system.

30. A detection device for use in a line-by-line scanning system in which an image is scanned and a video signal is produced representative of said scanned image, said detection device including first comparator means for comparing the instantaneous of the video signal with a reference voltage for generating a detected signal dependent on said comparison, means for delaying the detected signal for a predetermined period of time, second comparator means for comparing the delayed detected signal with the detected signal obtaining at the end of said predetermined time period and gate means for releasing the delayed detected signal dependent on hte comparison performed by said second comparator means.

31. A detection device as set forth in claim 30 wherein the detected signal is delayed for a period of time which is equal to a small increment of a complete line scan period.

32. A detection device as set forth in claim 30 wherein the detected signal is delayed for a complete line scan period.

33. A detection device as set forth in claim 30 wherein the signal delay means is a shift register.

34. A detection device for use in a line-by-line scanning system in which an image is scanned and a video signal is produced representative of said scanned image, said detection device including first comparator means for comparing the instantaneous excursion of the video signal with a reference voltage for generating a detected signal dependent on said comparison, means for delaying the detected signal for a predetermined period of time, second comparator means for comparing the delayed detected signal with the detected signal obtaining at the end of said predetermined time period and gate means for releasing the delayed detected signal dependent on the comparison performed by said second comparator means, delay means for delaying the video signal to produce a second video signal, means for generating a voltage having a value which lies between the amplitude values of the signals supplied thereto, means for supplying said video signal and second signal to the voltage generating means, and means for supplying said voltage as said reference voltage to said first comparator means.

35. A detection device for use in a line-by-line scanning in which an image is scanned and a video signal is produced representative of said scanned image, said detection device including first comparator means for comparing the instantaneous excursion of the video signal with a reference voltage for generating a detected signal dependent on said comparison, means for delaying the detected signal for a predetermined period of time, second comparator means for comparing the delayed detected signal with the detected signal obtaining at the end of said predetermined time period and gate means for releasing the delayed detected signal dependent on the comparison performed by said second comparator means, delay means having an input and a pluarlity of outputs whereby a corresponding plurality of separate different delayed video signals are obtained, means for selecting the highest and lowest of the amplitude values of the video signal and delayed video signals, means for generating a voltage having a value which lies between the said highest and lowest amplitude values, and means for supplying said voltage as said reference voltage to said first comparator means.

36. In a line-by-line scanning system in which an image is scanned and a video signal is produced representative of the scanned image, signal delay means for delaying the video signal by a fixed time interval, means for combining the video signal and the delayed video signal to form a combined signal, comparator means for comparing the instantaneous excursions of the video signal with a threshold voltage to produce a detected signal and means fo deriving said threshold voltage from said combined signal and for supplying said threshold voltage to the comparator means.

37. In the system as set forth in claim 36 additional signal delay means for delaying the delayed signal by a second fixed time interval, means for combining the signal delayed by the second fixed time interval with said video signal to form a second combined signal said means for deriving said threshold signal deriving it from both said combined and said second combined signals.

38. A detection device for use in a line-by-line system in which an image is scanned and a video signal is produced representative of said scanned image, said detection device including:

signal delay means for delaying the video signal to produce at least one delayed video signal, means for selecting the one of the current and delayed video signals having the maximum amplitude value, means for generating a reference voltage which is a function of the said maximum amplitude value and, means for comparing the instantaneous amplitude of one of said signals with the reference voltage and generating a detected signal dependent on the comparison.

39. A detection device for use in a line-by-line scanning system in which an image is scanned and a video signal is produced representative of said scanned image, said detection device including:

signal delay means for delaying the video signal to produce at least one delayed video signal, means of selecting the one of the current and delayed video signals having the minimum amplitude value, means for generating a reference voltage which is a function of the said minimum amplitude value and, means for comparing the instantaneous amplitude of one of said signals with the reference voltage and generating a detected signal dependent on the comparison.

40. A detection device for use in a line-by-line scanning system in which an image is scanned and a video signal is produced representative of said scanned image, said detection device including:

signal delay means for delaying the video signal to product a plurality of delayed signals, means for selecting from the video signal and said delayed signals the signals having the maximum and minimum amplitude values, means for generating a reference voltage which is a function of a combination of the said maximum and minimum amplitude values, means for generating a reference voltage which is a function of a combination of the said maximum and minimum amplitude values and, means for comparing the instantaneous amplitude of one of said delayed signals with the reference voltage and generating a detected signal dependent on the comparison.

41. A detection device for use in a line-by-line scanning system in which an image is scanned and a video signal is produced representative of said scanned image said detection device including, delay means having an input for receiving said video signal for delaying said signal a small fraction of a line scan, and also having a plurality of outputs whereby a corresponding plurality of separate differently delayed video signals are obtained, means for selecting the highest and lowest of the amplitude values of the video signal and delayed video signals, means for generating a reference voltage having a value which lies between the said highest and lowest amplitude values, and comparator means for comparing the instantaneous amplitude of one of the delayed video signals with the reference voltage and for generating a detected signal dependent on the comparison, means operable in response to said comparison to release as the detected signal the lower of the selected amplitude values while the amplitude of the one delayed video signal is less than the reference voltage and the higher of the selected amplitude values while the amplitude of the one delayed video signal is greater than the reference voltage.

42. A detection device for use in a line-by-line scanning system in which an image is scanned and a video signal is produced representative of said scanned image said detection device including, delay means having an input for receiving said video signal for delaying said signal a small fraction of a line scan, and also having a plurality of outputs whereby a corresponding plurality of separate differently delayed video signals are obtained, means for selecting the highest and lowest of the amplitude values of the video signal and delayed video signals, means for generating a reference voltage having a value which lies between the said highest and lowest amplitude values, and comparator means for comparing the instantaneous amplitude of one of the delayed video signals with the reference voltage and for generating a detected signal dependent on the comparison, means for comparing the magnitude of the instantaneous amplitude of at least one of said delayed video signals with another voltage and means for controlling the release of the detected signal dependent on the comparison, said other voltage being the instantaneous amplitude value of another of said delayed video signals.

* * * * *